United States Patent [19]
Safargar

[11] Patent Number: 6,152,218
[45] Date of Patent: Nov. 28, 2000

[54] APPARATUS FOR REDUCING THE PRODUCTION OF PARTICULATE MATERIAL IN A SUBTERRANEAN WELL

[75] Inventor: Mohammad Reza Safargar, Hobbs, N. Mex.

[73] Assignee: Texaco Inc., White Plains, N.Y.

[21] Appl. No.: 09/174,871

[22] Filed: Oct. 19, 1998

[51] Int. Cl.$^7$ ............................................... E21B 43/12
[52] U.S. Cl. ............................................................ 166/105.1
[58] Field of Search ................................................ 166/105.1

[56] References Cited

U.S. PATENT DOCUMENTS

| | | | |
|---|---|---|---|
| Re. 31,604 | 6/1984 | Bearden et al. | 161/232 |
| 1,367,406 | 2/1921 | McLean . | |
| 1,379,302 | 5/1921 | Hart | 166/105.1 |
| 1,397,836 | 11/1921 | Karns | 166/105.1 |
| 1,455,871 | 5/1923 | Fleming | 166/105.1 |
| 1,572,022 | 2/1926 | King | 166/105.1 |
| 1,592,079 | 7/1926 | Chancellor et al. | 166/105.1 |
| 1,992,718 | 2/1935 | Records . | |
| 2,029,323 | 2/1936 | Jones | 166/105.1 |
| 2,342,913 | 2/1944 | Williams et al. . | |
| 2,429,043 | 10/1947 | Barnhart | 166/105.1 |
| 2,858,894 | 11/1958 | Akeyson . | |
| 2,877,852 | 3/1959 | Bashara . | |
| 2,985,241 | 5/1961 | Hanslip . | |
| 3,106,526 | 10/1963 | Schmidt | 166/105.1 |
| 3,327,865 | 6/1967 | Thompson . | |
| 3,785,409 | 1/1974 | Smith, III | 140/92.2 |
| 3,908,256 | 9/1975 | Smith, III | 29/163.5 |
| 3,958,634 | 5/1976 | Smith, III | 166/233 |
| 4,064,938 | 12/1977 | Fast | 166/236 |
| 4,317,023 | 2/1982 | Gryskiewicz | 219/121 |
| 4,388,968 | 6/1983 | Brandell | 166/236 |
| 4,406,326 | 9/1983 | Wagner | 166/227 |
| 4,428,431 | 1/1984 | Landry et al. | 166/298 |
| 4,476,925 | 10/1984 | Cox | 166/105.1 |
| 4,494,603 | 1/1985 | Harguindey | 166/231 |
| 4,495,073 | 1/1985 | Beimgraben | 210/448 |
| 4,526,230 | 7/1985 | Kojicic | 166/236 |
| 4,649,996 | 3/1987 | Kojicic et al. | 166/228 |
| 4,681,161 | 7/1987 | Arterbury et al. | 166/227 |
| 4,811,790 | 3/1989 | Jennings, Jr. et al. | 166/278 |
| 4,821,800 | 4/1989 | Scott et al. | 166/228 |
| 4,856,591 | 8/1989 | Donovan et al. | 166/278 |
| 4,858,691 | 8/1989 | Ilfrey et al. | 166/278 |
| 5,082,052 | 1/1992 | Jones et al. | 166/51 |
| 5,088,544 | 2/1992 | Arterbury et al. | 166/228 |
| 5,115,864 | 5/1992 | Gaidry et al. | 166/278 |
| 5,232,048 | 8/1993 | Whitebay et al. | 166/228 |
| 5,341,880 | 8/1994 | Thorstensen et al. | 166/278 |
| 5,404,954 | 4/1995 | Whitebay et al. | 166/369 |
| 5,411,084 | 5/1995 | Padden | 166/230 |
| 5,664,628 | 9/1997 | Koehler et al. | 166/369 |

Primary Examiner—Hoang Dang
Attorney, Agent, or Firm—Morris N. Reinisch; Howrey Simon Arnold & White

[57] ABSTRACT

The present invention is directed to an apparatus for reducing the production of sand and other mineral particles within the production fluids of a subterranean wells. The apparatus includes a tubular conduit having openings therein which are protected by flow diversion shields. The flow diversion shields are arranged so that the flow of the production fluids into the tubular conduit is less than the gravitationally induced falling rate of the particulate material thereby separating a majority of the particulate material from the production fluid.

12 Claims, 4 Drawing Sheets

APPARATUS FOR REDUCING THE PRODUCTION OF PARTICULATE MATERIAL IN A SUBTERRANEAN WELL

BACKGROUND OF THE INVENTION

1. Field of the Invention

The present invention is generally directed to an apparatus that separates particulate material, such as sand, or other mineral particles from fluids produced from a subterranean formation. The apparatus is particularly useful for replacing sand filters and other similar devices in oil and gas wells.

2. Background

Oil and gas wells are drilled from the earth's surface, the well borehole penetrating into a subterranean hydrocarbon producing formation. Such formations are typically made up of porous rock. That is, oil does not occur normally in the manner contemplated by the general public, that is, in pools of liquid. Instead, hydrocarbons, such as oil and gas are typically found in a rock strata that has porosity and permeability sufficient that entrapped hydrocarbon can flow through the formation. As the porosity of a rock formation increases, the quantity of hydrocarbons in proportion to the mass of the rock can also increase. Further, as the permeability of a rock formation increases, the more freely hydrocarbons can flow from the formation.

In the course of completing an oil and/or gas well, it is common practice to run a string of casing into the well bore and then to run the production tubing inside the casing. At the well site, the casing is perforated across one or more production zones to allow production fluids to enter the casing bore. During production of the formation fluid, mineral particles, often referred to as sand, may be swept into the flow path. The sand may erode production components, such as the downhole pump or sucker rod pump, the control valves on the surface, etc. in the flow path. In some completions, the well bore is uncased, and an open face is established across the oil or gas bearing zone. When substantial quantities of sand are carried along as oil and/or gas is removed from a formation, the sand can eventually plug the openings into the interior of tubing by which the hydrocarbon production is withdrawn to the earth's surface.

The hydraulic fracturing of the formations may also be another source of mineral particles in production fluids (i.e. oil and other hydrocarbons mixed with water). During hydraulic fracturing, propant or other fine mineral particles are injected into the openings and fractures created by the application of hydraulic pressure on the formation. The intended role of the injected propant or mineral particles is to keep the fractures open once the hydraulic pressure is released and production of oil begins. In some cases however, the backflow of oil, water and other production fluids wash the propant or mineral particles from the crack. As with sand particles previously discussed, the presence of propants or other mineral particles in the produced fluids results in the premature water of the down hole pumps and equipment.

For the above stated reasons and other reasons which should be known to one or ordinary kill in the art, it is important to prevent as much sand, propant or other mineral particles as is possible from entering into production tubing in a well and, for this purpose, filters, also known as sand filters or sand screens, have long been employed in the petroleum industry.

One or more sand screens may be installed in the flow path between the production tubing and the perforated casing (i.e. fully completed well) or the open well bore face (i.e. partially completed well). Often a rubber packer is customarily set above the sand screen to seal off the portion of the well bore where production fluids flow into the production tubing. The annulus around the screen may be packed with a relatively coarse sand or gravel which acts as a filter to reduce the amount of sand reaching the screen. A work string and service seal unit (SSU) is typically used to spot the gravel around the screen. During well completion, gravel may also be pumped and squeezed into the producing formation around the screen for filtering unconsolidated material out of the infilling well fluid. The gravel is pumped down the work string in a slurry of water or gel and is spotted directly under the packer or above the sand screen. The gravel also typically fills the annulus between the sand screen and the well casing. In well installations in which the screen is suspended in an uncased open hole, the gravel pack supports the surrounding unconsolidated formation.

Conventional sand screens typically employ a perforated mandrel which is surrounded by longitudinally extending spacer bars, rods or ribs and over which a continuous wire is wrapped in a carefully spaced spiral configuration to provide a predetermined longitudinal gap between the wire turns. For example see, U.S. Pat. No. 3,785,409; U.S. Pat. No. 3,958,634; and U.S. Pat. No. 3,908,256. The aperture between turns permits formation fluids to flow through the screen, while the closely spaced wire turns exclude free particulate material such as sand or gravel which may penetrate the gravel pack.

A problem which arises during initial production following the gravel packing operation is that fine sand may be carried through the gravel pack before the gravel pack bridge stabilizes. It is not unusual to produce a substantial amount of such fine sands before the gravel pack finally consolidates and yields clean production. During the early stages of producing the well after gravel packing, those fines tend to migrate through the gravel pack and screen and lodge within the inner annulus between the outer wire wrap and the perforated mandrel. In some instances, this can cause severe erosion of the screen and ultimate failure of the screen to reduce sand invasion. In other situations, the plugging materials may be carbonaceous, siliceous or organic solids which can completely plug the flow passages and terminate production shortly after completion. In deep wells, when the screen becomes plugged and the pressure in the production tubing is reduced, the formation pressure can collapse the screen and production tubing. Moreover, when a substantial amount of sand has been lost from the surrounding formation, the formation may collapse with resultant damage to the well casing or liner and consequent reduction or termination of production.

One attempt to overcome the foregoing problems is to interpose a prepack of gravel within the annulus between the inner mandrel and the outer wire screen. The prepacked gravel is sized appropriately to exclude the small mineral particles which accompany the formation fluid during production. Raw gravel, as well as epoxy resin coated gravel, have been used extensively in prepacked well screens. Some prepacked well screens are subject to retrieval problems due to their outer diameter being larger than that of a conventional well screen. In order to make prepacked well screens more easily retrievable, the inner mandrel is usually downsized, therefore imposing restrictions on both production and completion tool string bore sizing. Some prior art well screens have utilized an inner wire cloth or steel wire woven fabric filter media in order to achieve maximum annular placement and retention of prepacked filter materials. See, for example, U.S. Pat. No. 4,858,691 and U.S. Pat. No. 4,856,591. Such woven wire retainers do not provide free flow comparable to the conventional rib-channel design which is characteristic of resistance welded well screens. The wire mesh retainer which is wrapped directly onto the perforated mandrel only permits free flow to occur where it overlaps flow passages on the mandrel. Even in this instance, flow through the perforations is further restricted where the wire mesh retainer overlaps itself. The prior art sand screens which utilize fine wire woven retainers can result in plugging due to the fact that the openings in the wire mesh are typically considerably smaller than the flow openings in the outer screen member.

Additional information about sand filters and their application in oil or gas wells, see the following U.S. Pat. Nos. 1,367,406; 4,649,996; 1,992,718; 2,342,913; 2,985,241; 2,877,852; 2,858,894; 3,327,865; 4,064,938, 4,317,023; 4,388,968; 4,406,326; 4,428,431; 4,495,073; 4,494,603; 4,526,230; 4,649,996; 4,681,161; 4,811,790 and 4,821,800. Some filtration systems include the use of packing material, and for reference to these type of filters see U.S. Pat. Nos. 5,082,052; 5,115,864 and 5,232,048.

The sand filters described above can be considered deficient in several ways. In one way, many of the materials used for providing sand filtration do not possess the required ability to screen out small sand particles, that is, the screening materials let small diameter sand through that can ultimately cause blockage of flow paths or high pump wear as noted above. A second problem is that they have relatively small external surface areas so that sand builds up, blocking further flow. It should be apparent to one of ordinary skill in the art that longer filter life can be achieved in direct relationship to the external surface area of the filter. Unfortunately, many of the materials that have been used in previous type sand filters do not lend themselves to designing a sand filter in a way to increase the external surface area. A third problem is that many materials that are used for filtration are not capable of withstanding the harsh environment of a producing well. Corrosion of the wire filter components of sand filters is one of the principle cause of the failure of the sand filter to function properly. This is especially true in situations in which the oil being produced is a "sour" oil in which corrosive sulfur and/or nitrogen containing compounds are present. A fourth problem with some type filters is that they are expensive to manufacture and difficult to install. A fifth problem is that a high hydrostatic head is generated due to the filtering action of the sand filter. This results in lower overall production and higher cost for pumping the production fluids to the surface.

It should be apparent to one of ordinary skill in the art that there exists a continuing need in the petroleum industry for a simple, inexpensive device that effectively removes mineral particles from the production fluids prior to the production fluids being pumped to the surface.

SUMMARY OF THE INVENTION

The present invention is generally directed to an apparatus for reducing the production of sand in a subterranean well during the pumping of fluids from the well. The present invention may be utilized in fully completed wells or in partially completed wells. In particular the apparatus includes a tubular conduit with at least one opening in the tubular conduit so that formation fluids (such as oil, gas, or other fluids) flow from the formation into the tubular conduit. Covering the opening is a flow diversion shield. The flow diversion shield is mounted on the exterior wall of the tubular conduit such that the pathway of fluid communication of a particulate containing fluid is such that a majority of the particulate material in the particulate containing fluid is separated from the fluid portion of the particulate containing fluid. The apparatus of the present invention is especially useful in oil wells in which the particulate containing fluid includes crude oil and the particulate material includes sand or other fine particulate material that may be produced along with the crude oil. Both the tubing and/or the flow diversion shield may be made from materials including metal, treated metal, metal alloy, polymer coated metal, polymer, polymer fiber composites, fiberglass, resin fiber composite materials or combinations of these materials. The flow diversion shield preferably includes a support flange rigidly fixed to the outer wall of the conduit, and extending outwardly away from the outer wall of the conduit; and a flow shield including a band the diameter of which is greater than the diameter to the tubular conduit. The upper rim of the band is connected to the support flange. The width of the band should be sufficient to divert the flow of the particulate containing fluid into the opening in the conduit such that the flow of the fluid component into the interior space of the conduit is less than the gravitationally induced falling rate of the particulate material thereby separating a majority of the particulate material from the fluid component prior to the passage of the fluid component from the exterior space surrounding the conduit into the interior space of the conduit.

These and other features are more fully set forth and illustrated in the following drawings and description of the illustrative embodiments of the present invention.

BRIEF DESCRIPTION OF THE DRAWINGS

The description is presented with reference to the accompanying drawings in which.

DESCRIPTION OF ILLUSTRATIVE EMBODIMENTS

The present invention is an apparatus for the removal of particles from fluids. Of particular interest is the downhole removal of sand particles and other mineral particles from production fluids, such as crude oil, water, or mixtures of water and crude oil. As noted above, the benefits of removing mineral particles from such fluids is important to prolonging the useful life of downhole pumps, production tubing and the like.

One of skill in the art should understand an appreciate that the present invention is useful in all kinds of wells, including fully completed wells and partially completed wells. The application of the present invention should be substantially similar in either type of well and therefore such use is within the contemplation of the inventor. Although the following description is utilizes the application of the present invention to a partially completed well, one of ordinary skill in the art would appreciate that the partially completed well could be replaced by a completed well bore and not depart from the present invention.

Figure 1:
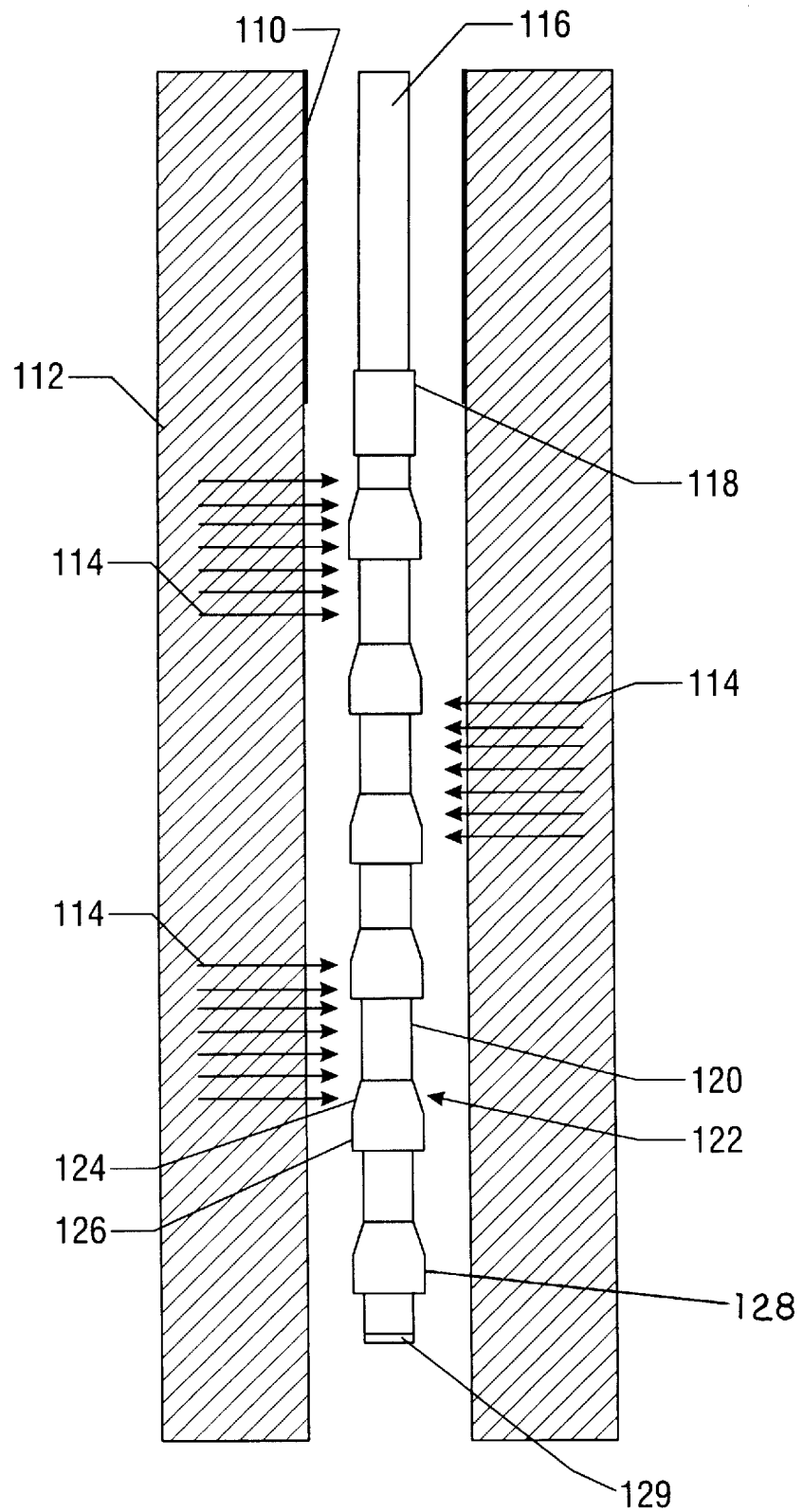
FIG. 1 is a cut-away side view of a subterranean well in which the present invention is installed.

Turning to FIG. 1, shown is a cut away view of a down hole portion a subterranean well, preferably an oil well, which is partially completed with a well casing 110 that does not extend to the bottom of the hole. Such a well should be known to one of ordinary skill in the art as an uncompleted well or open hole completion. The well penetrates an oil bearing subterranean formation 112 and production fluids such as hydrocarbons (i.e. oil and gas and water) flow into the bottom of the well as shown by arrows 114. The flow of fluids may be due to the natural pressure of the formation (i.e. primary production fluids) or they may be due to secondary recover or enhanced oil recovery operations. In the case of a fully completed well, the well casing would be perforated and the flow of production fluids would be substantially similar in nature as that shown by the arrows. Regardless, the ground production tubing 116 is inserted down the well from the surface to the zone of production in order to remove the production fluids from the well. As shown in FIG. 1, the production tubing 116 has on its bottom end a threaded connector that permits the connection of a tubular conduit 120 or tubular sub, which has been modified in accordance with the present invention. The tubular conduit 120 is perforated with openings (not shown) and which are shielded by flow diversion shields 122 which are rigidly connected to the tubular conduit. Each flow diversion shield is positioned such that a majority of the particulate materials within the production fluids are separated from the production fluids. This separation process is preferably caused by the diversion of the production fluids such that the flow of fluids into the tubular conduit is less than the gravitationally induced falling rate of the particulate material. As is discussed below, this is believed to be the mechanism by which the particulate material is separated from the production fluids. As shown in FIG. 1, each flow diversion shield includes a support flange 124 and a flow shield 126. The purpose of the support flange is to support the flow shield a predetermined distance from the outer surface of the tubular conduit. Depending upon the material, the support flange may be welded, molded, fused, glued or otherwise rigidly connected to the outer surface of the tubular conduit at a point above the top edge of the opening. Connected to the support flange is the flow shield (126) which can generally be described as a band having a diameter greater than the diameter of the tubular conduit and a width sufficient to prevent the direct flow of production fluids through the opening and into the tubular conduit. On the bottom end of the tubular conduit below the bottom most flow diversion shield 128 the tubular conduit is capped 129 in a conventional manner to prevent the inflow of fluids into the tubular conduit.

Figure 2:
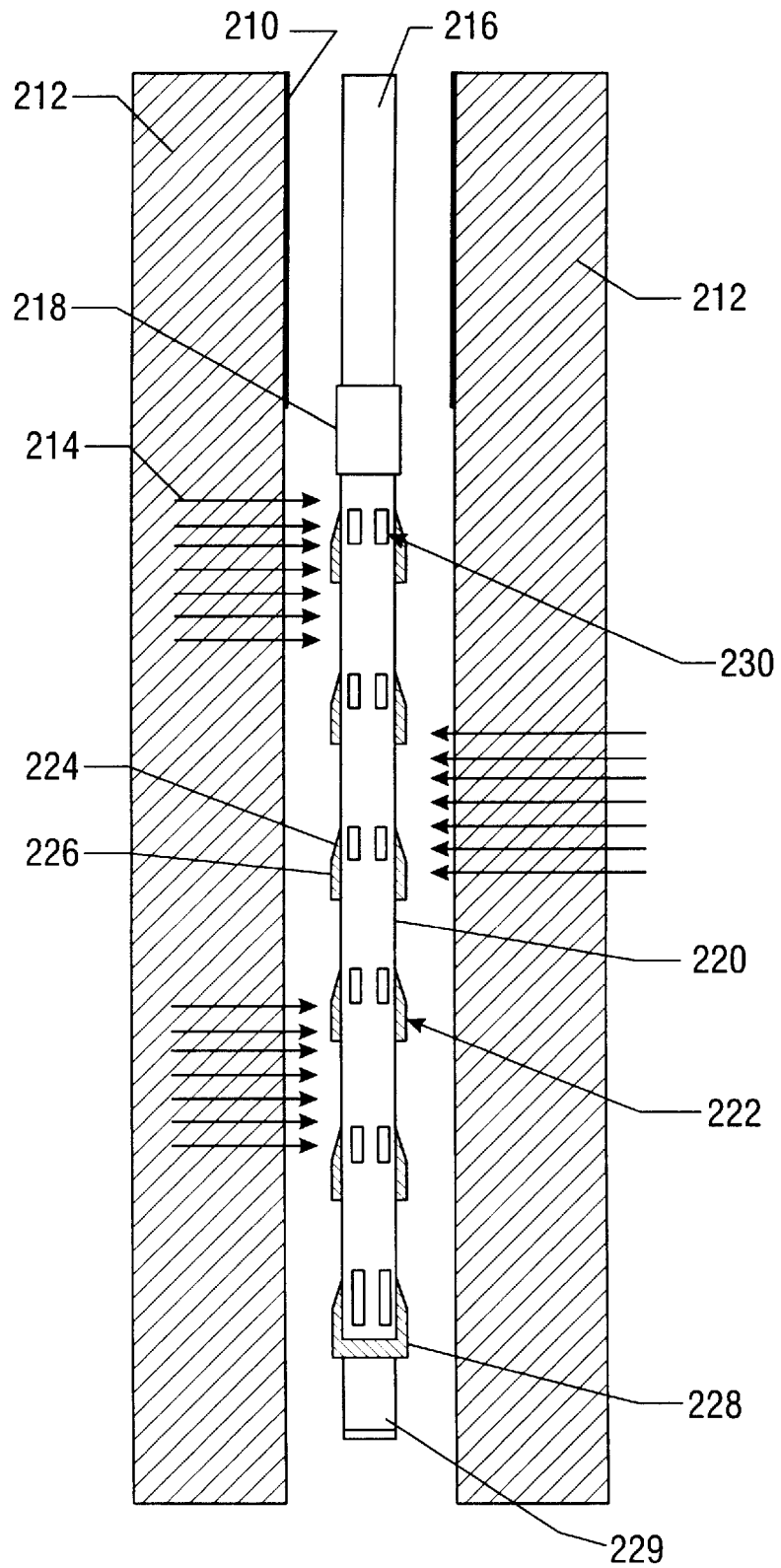
FIG. 2 is a cross-sectional view of a subterranean well in which the present invention is installed.

FIG. 2 illustrates a cross-sectional view of the apparatus shown in FIG. 1 and described above. For the purposes of this figure, items identified in FIG. 1 have retained the same last two digits of their figure numbers, but the first digit has been increased to correspond to the figure number. For example the well casing in FIG. 1 was given a figure number of 110, and the well casing in FIG. 2 has been given the figure number 210. Thus the above description of FIG. 1 is applicable to the present FIG. 2. Thus FIG. 2 shows an embodiment of the present invention in place in an open hole well in a oil bearing formation (212) in which production fluids including oil, flow as generally indicated by arrows (214). On the downhole end of the production tubing (216) a threaded connector (218) connects the production tubing to a tubular conduit (220) which has more than one opening (230). Each opening has a flow diversion shield (222), which prevents the direct flow of production fluids out of the oil bearing formation (212), into the tubular conduit and in turn being pumped to the surface or otherwise produced. The flow diversion shields (222) include a support flange (224) and a flow shield (226) as described above. As can be seen in FIG. 2, there may be a plurality of openings which any particular flow diversion shield protects from direct flow. The number of openings per shield depends upon a number of factors including the flow rate of the production fluids, the size and nature of the mineral particles to be excluded, the desired rate of production, the structural integrity of the tubular conduit and so forth. An important criteria in determining the size and number of the openings is that the planar surface area of the openings should be equal to or greater than the area of flow around the flow diversion shield. The area of flow around the flow diversion shield, herein defined as the "allowable area," is that planar surface area defined by the outer wall of the tubular conduit and the inner wall of the flow diversion shield. For example if the tubular conduit is a 2 inch (5.1 cm) outer diameter tube, and the inner diameter of the flow diversion shield is 3 inches (7.6 cm), the allowable area can be calculated as follows:

$$\text{Allowable area} = [(3 \text{ inches})^2 - (1 \text{ inches})^2] \pi = 1.25 \pi \text{ (inches}^2) = 3.93 \text{ inches}^2$$

One of ordinary skill in the art should be able to adjust these parameters so as to optimize the flow of production fluids in and the exclusion of the particular materials from the production fluids. It should also be noted that the openings may be either slots cut into the tubular conduit, holes drilled through the tubular conduit or any other shaped opening. Of importance however is that the structural stability of the tubular conduit should be maintained to the greatest extent possible, and therefore round holes serve as the openings in the preferred embodiment of the present invention.

In view of the above figures, one of ordinary skill in the art should understand and envision that the flow of production fluids would be as follows: out of the formation and into the well bore; from the well bore around the flow diversion shield and into the tubular conduit via the openings; up the tubular conduit past the threaded connector and into the production tubing which eventually takes the production fluids to the surface.

Figure 3:
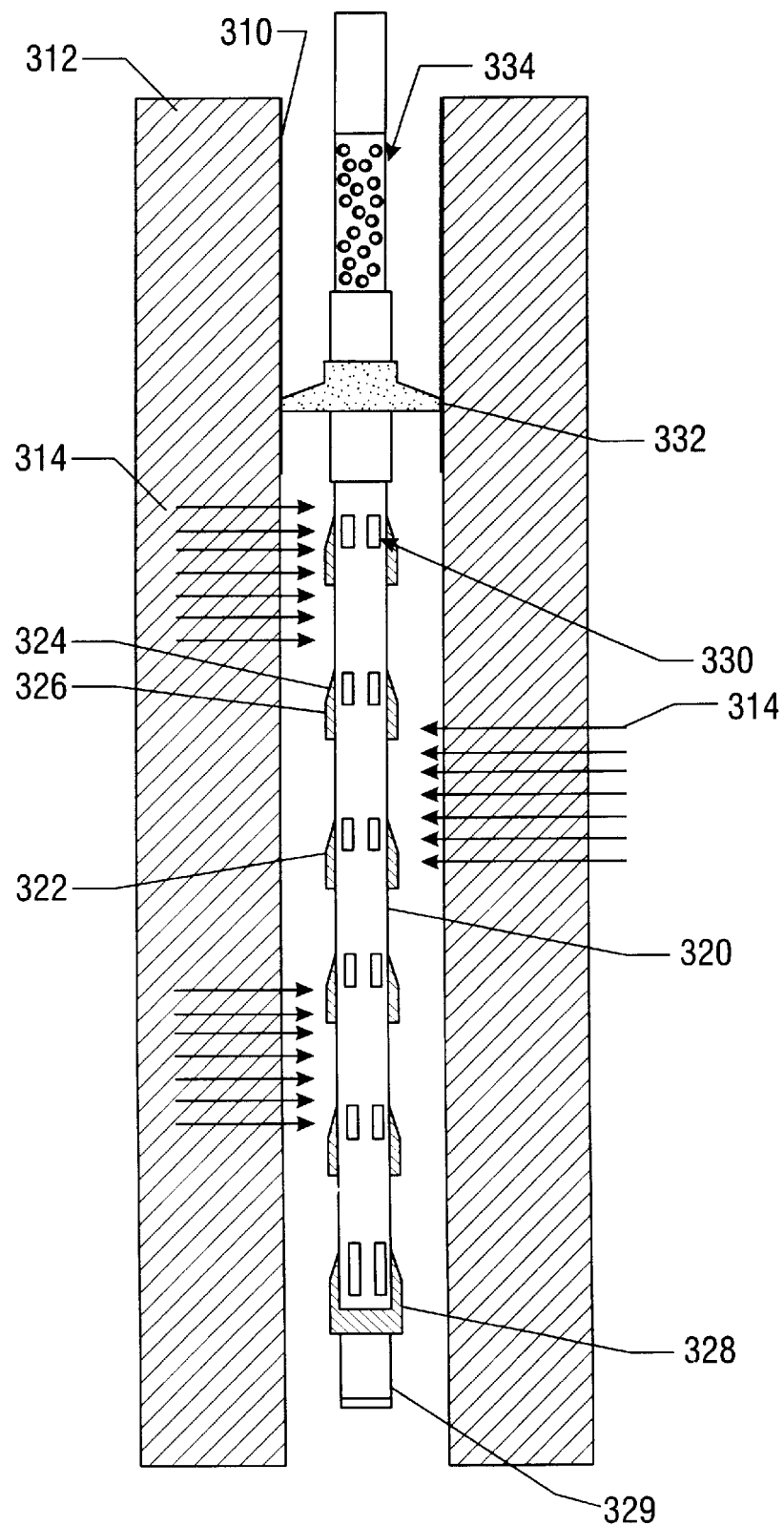
FIG. 3 is a cross-sectional view of a subterranean well in which the present invention is installed with a perforated sub connecting pipe.

Another embodiment of the present invention is illustrated in FIG. 3 in which a perforated subsection of tubing 334, is connected to the device of the present invention. In such an installation, a rubber sealer 332 is utilized to isolate the production fluids in the cased well from the production fluids in the uncompleted well bore. Such an arrangement may be used in situations in which a downhole submersible pump (not shown) is utilized to pump the fluids to the surface. Thus the flow of fluids would be from the formation, past the flow diversion shield and into the tubular conduit, out the perforated sub and into the cased well, and then from the cased well through the pump and up to the surface via production tubing.

As previously noted, the present invention may be utilized in both partially completed wells as illustrated in the FIG's or in fully completed wells. In this latter situation, the casing will be perforated using a conventional perforating gun. Regardless of the type of well in which the present invention is utilized, the principles of the present invention should still apply as one of ordinary skill in the art should appreciate.

The vertical placement of the apparatus of the present invention should be such that the production fluids flow into the tubular conduit. In one embodiment, the bottom of the well is just below the bottom flow diversion shield and end cap. Production stops when the collected mineral particles make production no longer possible. In another embodiment the apparatus is vertically suspended in the upper portions of a formation and thus a "rat hole" is formed below the separation apparatus. The purpose of the rat hole is to serve as a space for the mineral particles which have been separated from the production fluids, to fall and accumulate without sanding in the separation apparatus. In another alternative embodiment the open hole area around the apparatus is packed with gravel which serves the duel function of stabilizing the well and as a course filter for larger mineral particles.

As previously noted, it is believed that the ability of the apparatus of the present invention to effectively separate mineral particles from production fluids is based on the gravitationally induced separation of the mineral particles from the production fluids. That is to say the apparatus has been designed so that the production fluids can not flow directly into the tubular conduit. Instead, the production fluids must flow around the flow diversion shield and then into the tubular conduit. This diversion of flow is believed to cause the mineral particles to either hit the flow diversion shield or tubing body itself. This contact between the mineral particle and the flow diversion shield is believed to cause a loss in momentum in the mineral particle, thus making it less likely for the mineral particle to be carried along with the flowing production fluids. In addition, it is hypothesized that the flow diversion shields cause a change in direction of the flow of the production fluids and this in turn creates a slight pressure drop which slows the flow of fluid enough for the solids to fall out due to gravity.

Regardless of the actual mechanism of operation, it has been found that the apparatus of the present invention significantly and surprisingly increases the life of downhole pumps and other components in oil wells that have a high mineral particle content, especially in wells that have been hydraulically fractured. The apparatus of the present invention was installed in a well that was experiencing equipment failures about every 8 days due to the accumulation of mineral particles (i.e. sand) due to a previously conducted fracturing process. One of ordinary skill in the art should appreciate that such a well can not be operated economically because of the high maintenance costs. Upon installation of the apparatus of the present invention, the run time increased to about 6 weeks before sand induced failure occurred. It should be noted that the apparatus was installed so that a 30 foot rat hole existed between the bottom of the apparatus and the bottom of the well. The mineral particles accumulated to such an extent that in 6 weeks, the 30 feet of rat hole was filled with accumulated sand and sanded in the separation apparatus. In other less "sandy" wells, the present invention has extended the productive well time to about 7 to 8 months after the installation of the present invention.

Another benefit of the present invention is the reduction in the hydrostatic head on the production formation, which helps to increase the production of fluids from the well. Prior to the installation of the apparatus of the present invention, a Cavin sand filter was used below the production equipment (i.e. down hole pump, etc..) to eliminate sand from getting into the production equipment and causing excessive wear. Under these conditions the well was producing about 55 barrels of oil, 68 barrels of water and 30,000 cubic feet of casing head gas per day. Upon replacement of the conventional sand filter with the apparatus of the present invention, the down hole pump was lowered by approximately 500 feet and the well began producing 165 barrels of oil, 105 barrels of water and 24,000 cubic feet of casing head gas. It is believed that this increase in productivity was because the formation was sensitive to hydrostatic head pressure in the well bore and the apparatus of the present invention allowed the reduction of the hydrostatic head due to the present invention's unexpectedly superior ability to separate the mineral particles (i.e. sand) from the production fluids without creating a significant backpressure.

The above apparatus has been described as being made of non-corroding metal such as treated steel. However, one of ordinary skill in the art should appreciate that the apparatus of the present invention may be constructed of a wide variety of materials that are compatible with the downhole environment. Thus, the apparatus of the present invention may be constructed of metal (i.e. steel, aluminum, titanium, nickel, and other various metals) treated metals, metal alloys, polymer coated metals, polymers such as polyvinylchloride or other similar rigid polymers, polymer fiber composites, fiberglass and other similar resin fiber composite materials combinations of these materials and the like.

Figure 4A:
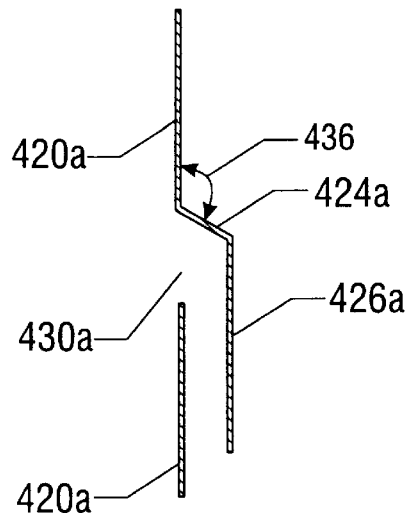
FIGS. 4a, 4b, and 4c are illustrations of alternative embodiments of the flow diversion shields of the present invention.
Figure 4B:
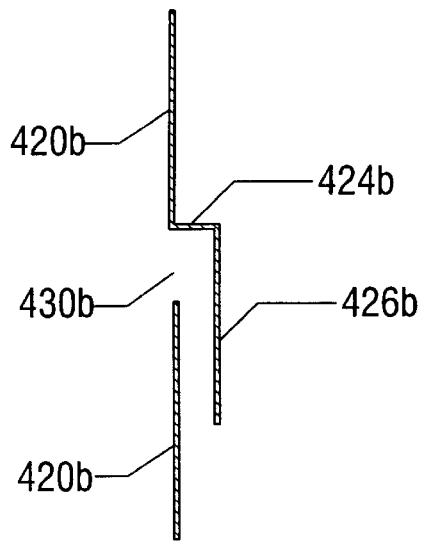
Figure 4C:
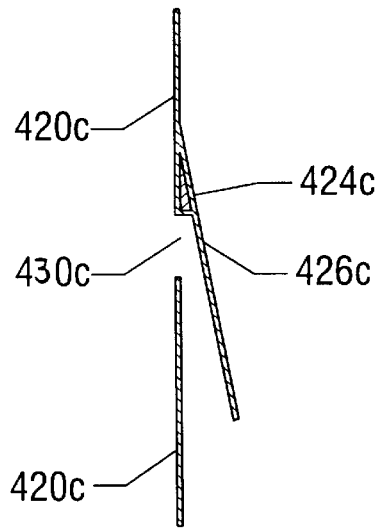

It should also be appreciated by one of ordinary skill in the art that the flow diversion shields may have a wide variety of configurations and still achieve the results of the present invention. Such variations are shown in FIG. 4a, 4b, and 4c. The flow diversion shield illustrated in FIG. 4a is similar to the flow diversion shields described above in that it includes a support flange 424a and flow shield 426a. The support flange is rigidly connected to the tubular conduit 420a above the opening 430a that forms the fluids connection between the interior of the tubular conduit and the production fluids in the well. The angle of the support flange relative to the tubular conduit surface indicated by the arrow 438a may be varied, but as a practical matter angles of about 80 to about 170 degrees may be used and angles between 90 and 30 degrees are preferred. Optimization of this angle so as to maximize the flow of production fluids with a minimum of mineral particles can be determined by conducting simulated conditions in a laboratory or in the field. FIG. 4b illustrates another embodiment of the flow diversion shield however in this case the angle between the support flange and the tubular conduit is about 90 degrees. FIG. 4c illustrates another variation within the scope of the present invention in which the support flange is a solid band 424c and the flow shield is angled away from the tubular conduit. In such cases the flow shield may need to be of a different length but this can be determined through flow studies. One of skill in the art should appreciate that the ability to vary the design of the fluid diversion shields may depend upon the material selected and the downhole conditions of the well. However, such variations are considered to be within the skill of one of ordinary skill in the art and thus are considered to be within the scope of the present invention.

In view of the forgoing disclosure, one of ordinary skill in the art should understand that an illustrative embodiment of the present invention may include: a tubular conduit having an exterior wall and an interior wall, the interior wall defining an interior space within the conduit and the exterior wall defining an exterior space surrounding the tubular conduit; at least one opening in the tubular conduit, the opening being defined by the exterior wall and the interior wall and forming a pathway of fluid communication between the exterior space and the interior space; a flow diversion shield, the flow diversion shield being mounted on the exterior wall of the tubular conduit such that the pathway of fluid communication of a particulate containing fluid from the exterior space to the interior space is such that a majority of the particulate material in the particulate containing fluid is separated from the fluid portion of the particulate containing fluid. The apparatus can be utilized such that the particulate containing fluid includes crude oil and the particulate material includes sand. The tubular conduit may be made of materials selected from metal, treated metal, metal alloy, polymer coated metal, polymer, polymer fiber composites, fiberglass, resin fiber composite materials or combinations of these materials. Likewise the flow diversion shield may be manufactured of materials selected from metal, treated metal, metal alloy, polymer coated metal, polymer, polymer fiber composites, fiberglass, resin fiber composite materials or combinations of these materials. For one preferred embodiment, the flow diversion shield may include a flow shield which itself may include a conical shaped band having an upper rim and a lower rim, the diameter of the lower rim of the band being greater than the diameter to the tubular conduit, the upper rim of the band having a diameter about that of the outer wall of the conduit, the upper rim being fixedly connected to the outer wall of the conduit above at least one of the openings, wherein the width of the band is sufficient to divert the flow of the particulate containing fluid into the opening in the conduit such that the flow of the fluid component into the interior space of the conduit is less than the gravitationally induced falling rate of the particulate material thereby separating a majority of the particulate material from the fluid component prior to the passage of the fluid component from the exterior space surrounding the conduit into the interior space of the conduit. In another alternative preferred embodiment, the flow diversion shield may include a support flange about the circumference of the outer wall of the conduit, the support flange having a first end and a second end, the first end being fixedly connected to the outer wall of the conduit above the opening, and the second end extending outward away from the outer wall of the conduit; a flow shield including a band having an upper rim and a lower rim, the diameter of the band being greater than the diameter to the tubular conduit, the upper rim of the band being fixedly connected to the second end of the support flange, wherein the width of the band is sufficient to divert the flow of the particulate containing fluid into the opening in the conduit such that the flow of the fluid component into the interior space of the conduit is less than the gravitationally induced falling rate of the particulate material thereby separating a majority of the particulate material from the fluid component prior to the passage of the fluid component from the exterior space surrounding the conduit into the interior space of the conduit.

Another illustrative embodiment of the present invention may include an apparatus for reducing the production of sand in a subterranean well. Such an apparatus may include: a conduit having an outer wall and an inner wall which define an interior space within the conduit and an exterior space surrounding the conduit; at least one opening defined by the inner and outer walls, the opening connecting in fluid communication the interior space of the conduit and the exterior space surrounding the conduit; and a flow diversion shield connected to the outer wall of the conduit, the flow diversion shield being oriented so as to divert the flow of a fluid containing suspended particles from the exterior space surrounding the conduit to the interior space of the conduit so as to separate by gravity a majority of the suspended particles from the fluid. Preferably, the tubular conduit may be made of materials selected from metal, treated metal, metal alloy, polymer coated metal, polymer, polymer fiber composites, fiberglass, resin fiber composite materials or combinations of these materials. Similarly, the flow diversion shield may include materials selected from metal, treated metal, metal alloy, polymer coated metal, polymer, polymer fiber composites, fiberglass, resin fiber composite materials or combinations of these materials.

The present invention may also include an apparatus for the downhole separation of particulate materials from particulate material containing fluid. In such an illustrative embodiment, the apparatus may include a tubular conduit having an exterior wall and an interior wall, the interior wall defining an interior space within the conduit and the exterior wall defining an exterior space surrounding the tubular conduit, the interior space being in fluid communication with a point on the surface of the earth and the exterior space being in fluid communication with a subterranean formation; at least one opening in the tubular conduit, the opening being defined by the exterior wall and the interior wall and forming a pathway of fluid communication between the exterior space and the interior space; and a flow diversion shield, the flow diversion shield being mounted on the exterior wall of the tubular conduit such that the pathway of fluid communication of a particulate containing fluid from the exterior space to the interior space separates a majority of the particulate material in the particulate containing fluid from the fluid portion of the particulate containing fluid. It is preferred that the tubular conduit be made from materials selected from metal, treated metal, metal alloy, polymer coated metal, polymer, polymer fiber composites, fiberglass, resin fiber composite materials or combinations of these materials. Likewise, it is preferable that the flow diversion shield be made from materials selected from metal, treated metal, metal alloy, polymer coated metal, polymer, polymer fiber composites, fiberglass, resin fiber composite materials or combinations of these materials.

The present invention has been described as being especially useful in the removal of sand and other mineral particles from the production fluids of an oil or gas well. However, it is within the contemplation of the present invention for this apparatus to be utilized in other applications in which it is desirable to have the separation of particles from fluids. For example, the above described apparatus may be used in geothermal wells to minimize the amount of mineral particles produced along with the geothermally heated water. Alternatively the apparatus of the present invention may be used as a replacement for a fluid "pick-up" filter. This may be useful in removing fluids from large storage tanks in which particle containing fluids have been placed for settling. Other similar applications will be apparent to one of ordinary skill in the art and are considered to be within the scope of the present invention.

While the structures and methods of the present invention have been described in terms of illustrative and preferred embodiments, it will be apparent to those of skill in the art that variations may be applied to the what has been described herein without departing from the concept and scope of the invention. All such similar substitutes and modifications apparent to those skilled in the art are deemed to be within the scope and concept of the invention as it is set out in the following claims.

What is claimed is:

1. An apparatus comprising:
  a tubular conduit having an exterior wall and an interior wall, the interior wall defining an interior space within the conduit and the exterior wall defining an exterior space surrounding the tubular conduit;
  at least one first opening in the tubular conduit, the at least one first opening being defined by the exterior wall and the interior wall and forming a first pathway of fluid communication between the exterior space and the interior space, the at least one first opening being in a first vertical position along the tubular conduit;

a first flow diversion shield, the first flow diversion shield being mounted on the exterior wall of the tubular conduit proximate to the at least one first opening such that the first pathway of fluid communication of a particulate containing fluid from the exterior space to the interior space is such that a majority of the particulate material in the particulate containing fluid is separated from the fluid portion of the particulate containing fluid and wherein the total planar area of the at least one first opening in the tubular conduit is equal to or greater than the allowable area for the first flow diversion shield protecting the at least one first opening;

at least one second opening in the tubular conduit, the at least one second opening being defined by the exterior wall and the interior wall and forming a second pathway of fluid communication between the exterior space and the interior space, the at least one second opening being in a second verticle position along the tubular conduit;

a second flow diversion shield, the second flow diversion shield being mounted on the exterior wall of the tubular conduit proximate to the at least one second opening such that the second pathway of fluid communication of a particulate containing fluid from the exterior space to the interior space is such that a majority of the particulate material in the particulate containing fluid is separated from the fluid portion of the particulate containing fluid and wherein the total planar area of the at least one second opening in the tubular conduit is equal to or greater than the allowable area for the flow diversion shield protecting the at least one second opening.

2. The apparatus of claim 1 wherein the particulate containing fluid includes crude oil and the particulate material includes sand.

3. The apparatus of claim 1 wherein the tubular conduit comprises materials selected from metal, treated metal, metal alloy, polymer coated metal, polymer, polymer fiber composites, fiberglass, resin fiber composite materials or combinations of these materials.

4. The apparatus of claim 1 wherein the flow diversion shield comprises materials selected from metal, treated metal, metal alloy, polymer coated metal, polymer, polymer fiber composites, fiberglass, resin fiber composite materials or combinations of these materials.

5. The apparatus of claim 1 wherein the flow diversion shield comprises a flow shield including a conical shaped band having an upper rim and a lower rim, the diameter of the lower rim of the band being greater than the diameter to the tubular conduit, the upper rim of the band having a diameter about that of the outer wall of the conduit, the upper rim being fixedly connected to the outer wall of the conduit above at least one of the openings, wherein the width of the band is sufficient to divert the flow of the particulate containing fluid into the opening in the conduit such that the flow of the fluid component into the interior space of the conduit is less than the gravitationally induced falling rate of the particulate material thereby separating a majority of the particulate material from the fluid component prior to the passage of the fluid component from the exterior space surrounding the conduit into the interior space of the conduit.

6. The apparatus of claim 1 wherein the flow diversion shield further comprises a support flange about the circumference of the outer wall of the conduit, the support flange having a first end and a second end, the first end being fixedly connected to the outer wall of the conduit above the opening, and the second end extending outward away from the outer wall of the conduit; and a flow shield including a band having an upper rim and a lower rim, the diameter of the band being greater than the diameter to the tubular conduit, the upper rim of the band being fixedly connected to the second end of the support flange, wherein the width of the band is sufficient to divert the flow of the particulate containing fluid into the opening in the conduit such that the flow of the fluid component into the interior space of the conduit is less than the gravitationally induced falling rate of the particulate material thereby separating a majority of the particulate material from the fluid component prior to the passage of the fluid component from the exterior space surrounding the conduit into the interior space of the conduit.

7. An apparatus for reducing the production of sand in a subterranean well, the apparatus comprising:

a conduit having an outer wall and an inner wall which define an interior space within the conduit and an exterior space surrounding the conduit;

at least one first opening defined by the inner and outer walls, the at least one first first opening connecting in fluid communication the interior space of the conduit and the exterior space surrounding the conduit, the at least one first opening being in a first vertical position along the tubular conduit;

a first flow diversion shield connected to the outer wall of the conduit proximate to the at least one first opening, the first flow diversion shield being oriented so as to divert the flow of a fluid containing suspended particles from the exterior space surrounding the conduit to the interior space of the conduit so as to separate by gravity a majority of the suspended particles from the fluid and wherein the total planar area of the at least one first opening in the tubular conduit is equal to or greater than the allowable area for the flow diversion shield protecting the openings;

at least one second opening defined by the inner and outer walls, the at least one second opening connecting in fluid communication the interior space of the conduit and the exterior space surrounding the conduit, the at least one second opening being in a second verticle position along the tubular conduit;

a second flow diversion shield connected to the outer wall of the conduit proximate to the at least one second opening the second flow diversion shield being oriented so as to divert the flow of a fluid containing suspended particles from the exterior space surrounding the conduit to the interior space of the conduit so as to separate by gravity a majority of the suspended particles from the fluid and wherein the total planar area of the at least one second opening in the tubular conduit is equal to or greater than the allowable area for the second flow diversion shield protecting the at least one second opening.

8. The apparatus of claim 7 wherein the tubular conduit comprises materials selected from metal, treated metal, metal alloy, polymer coated metal, polymer, polymer fiber composites, fiberglass, resin fiber composite materials or combinations of these materials.

9. The apparatus of claim 7 wherein the flow diversion shield comprises materials selected from metal, treated metal, metal alloy, polymer coated metal, polymer, polymer fiber composites, fiberglass, resin fiber composite materials or combinations of these materials.

10. An apparatus for the downhole separation of particulate materials from particulate material containing fluid, the apparatus comprising:

a tubular conduit having an exterior wall and an interior wall, the interior wall defining an interior space within the conduit and the exterior wall defining an exterior space surrounding the tubular conduit, the interior space being in fluid communication with a point on the surface of the earth and the exterior space being in fluid communication with a subterranean formation;

at least one first opening in the tubular conduit, the at least one first opening being defined by the exterior wall and the interior wall and forming a first pathway of fluid communication between the exterior space and the interior space, the at least one first opening being in a first vertical position alone the tubular conduit;

a first flow diversion shield, the first flow diversion shield being mounted on the exterior wall of the tubular conduit proximate to the at least one first opening such that the first pathway of fluid communication of a particulate containing fluid from the exterior space to the interior space separates a majority of the particulate material in the particulate containing fluid from the fluid portion of the particulate containing fluid and wherein the total planar area of the at least one first opening in the tubular conduit is equal to or greater than the allowable area for the first flow diversion shield protecting the at least one first opening;

at least one second opening in the tubular conduit, the at least one second opening being defined by the exterior wall and the interior wall and forming a second pathway of fluid communication between the exterior space and the interior space, the at least one second opening being in a second vertical position along the tubular conduit;

a second flow diversion shield the second flow diversion shield being mounted on the exterior wall of the tubular conduit proximate to the at least one second opening such that the second pathway of fluid communication of a particulate containing fluid from the exterior space to the interior space separates a majority of the particulate material in the particulate containing fluid from the fluid portion of the particulate containing fluid and wherein the total planar area of the at least one second opening in the tubular conduit is equal to or greater than the allowable area for the second flow diversion shield protecting the at least one second opening.

11. The apparatus of claim 10 wherein the tubular conduit comprises materials selected from metal, treated metal, metal alloy, polymer coated metal, polymer, polymer fiber composites, fiberglass, resin fiber composite materials or combinations of these materials.

12. The apparatus of claim 11 wherein the flow diversion shield comprises materials selected from metal, treated metal, metal alloy, polymer coated metal, polymer, polymer fiber composites, fiberglass, resin fiber composite materials or combinations of these materials.

* * * * *

UNITED STATES PATENT AND TRADEMARK OFFICE
CERTIFICATE OF CORRECTION

| | |
|---|---|
| PATENT NO. : 6,152,218 | |
| DATED : November 28, 2000 | |
| INVENTOR(S) : Mohammand Reza Safargar | |

It is certified that error appears in the above-identified patent and that said Letters Patent is hereby corrected as shown below:

Column 13,
Line 19, delete "alone" and insert -- along --.

Signed and Sealed this

Twenty-fifth Day of September, 2001

Attest:

*Nicholas P. Godici*

NICHOLAS P. GODICI
*Attesting Officer*        *Acting Director of the United States Patent and Trademark Office*